(12) United States Patent
Kawano et al.

(10) Patent No.: US 9,091,565 B2
(45) Date of Patent: Jul. 28, 2015

(54) MAGNETIC POSITION DETECTION APPARATUS

(75) Inventors: Yuji Kawano, Chiyoda-ku (JP); Hiroshi Kobayashi, Chiyoda-ku (JP); Kazuyasu Nishikawa, Chiyoda-ku (JP); Taisuke Furukawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 293 days.

(21) Appl. No.: 13/085,133

(22) Filed: Apr. 12, 2011

(65) Prior Publication Data

US 2012/0126797 A1 May 24, 2012

(30) Foreign Application Priority Data

Nov. 22, 2010 (JP) ................................. 2010-260105

(51) Int. Cl.
*G01R 33/09* (2006.01)
*G01B 7/14* (2006.01)
(Continued)

(52) U.S. Cl.
CPC .............. *G01D 5/147* (2013.01); *G01D 5/2451* (2013.01)

(58) Field of Classification Search
CPC ....... G01D 5/142; G01D 5/145; G01D 5/147;
G01D 5/2451; G01D 5/2013; G01D 5/24438;
G01D 5/2033; G01B 7/30; G01B 7/003;
G01P 3/3487; G01P 3/488; G01P 3/481;
G01P 15/105; G01R 33/06–3/098; G01R
33/0029; G01R 33/0005; G01R 33/095;
F16C 41/007
USPC ....................................... 324/207.21, 207.25
See application file for complete search history.

(56) References Cited

U.S. PATENT DOCUMENTS 4,361,805 A * 11/1982 Narimatsu et al. ........ 324/207.21
5,570,015 A * 10/1996 Takaishi et al. .......... 324/207.21
(Continued)

FOREIGN PATENT DOCUMENTS

DE 10311086 A1 10/2003
DE 10333249 A1 3/2004
(Continued)

OTHER PUBLICATIONS

Japanese Office Action issued Oct. 16, 2012, in corresponding Patent Application No. 2010-260105.
(Continued)

*Primary Examiner* — Bot Ledynh
(74) *Attorney, Agent, or Firm* — Sughrue Mion, PLLC; Richard C. Turner

(57) ABSTRACT

A magnetic position detection apparatus includes a substrate, a magnet, a bridge circuit including first through fourth magneto-electric converting elements formed on the substrate, and a detection circuit. A substrate surface is substantially perpendicular to a magnet magnetization direction. The second and third magneto-electric converting elements are, when viewed along the magnet magnetization direction, disposed to be on or in the vicinity of a straight line passing through a center point of a magnetic pole of the magnet and parallel to a straight line perpendicular to both the magnet magnetization direction and the magnetic mobile object. The first and fourth magneto-electric converting elements are disposed so that, when not opposed to the magnetic mobile object, a component of a substrate of a magnetic field to be applied thereto is substantially same as that of a magnetic field to be applied to the second and third magneto-electric converting elements.

23 Claims, 15 Drawing Sheets

(51) Int. Cl.
*G01B 7/30* (2006.01)
*G01D 5/14* (2006.01)
*G01D 5/245* (2006.01)

(56) References Cited

U.S. PATENT DOCUMENTS

| | | | |
|---|---|---|---|
| 6,246,234 B1* | 6/2001 | Yokotani et al. | 324/207.21 |
| 6,346,808 B1* | 2/2002 | Schroeder | 324/207.21 |
| 6,366,079 B1* | 4/2002 | Uenoyama | 324/207.21 |
| 7,723,984 B2* | 5/2010 | Shoji et al. | 324/252 |
| 7,733,210 B2* | 6/2010 | Furukawa et al. | 338/32 R |
| 2003/0173955 A1* | 9/2003 | Uenoyama | 324/207.21 |
| 2004/0017188 A1* | 1/2004 | Yokotani et al. | 324/207.21 |
| 2004/0095130 A1* | 5/2004 | Yokotani et al. | 324/207.21 |
| 2005/0225321 A1* | 10/2005 | Kurumado | 324/207.21 |
| 2009/0302833 A1* | 12/2009 | Kawano et al. | 324/207.25 |
| 2010/0052664 A1* | 3/2010 | Nishizawa et al. | 324/207.25 |

FOREIGN PATENT DOCUMENTS

| | | | |
|---|---|---|---|
| JP | 2004-109113 A | 4/2004 |
| JP | 3682052 B2 | 8/2005 |
| JP | 2007-285741 A | 11/2007 |
| JP | 2009-133751 A | 6/2009 |

OTHER PUBLICATIONS

German Office Action Application No. 102011104009.2; Issued Jan. 16, 2014.

* cited by examiner (a)

(b)

(a) VARIANCE OF SIGNAL A WHEN OPPOSED TO SLOT PORTION 102 OF MAGNETIC MOBILE OBJECT 100

(b) VARIANCE OF TEMPERATURE CHARACTERISTIC (ROOM TEMPERATURE→150°C) OF SIGNAL A WHEN OPPOSED TO SLOT PORTION 102 OF MAGNETIC MOBILE OBJECT 100

(a) VARIANCE OF SIGNAL A WHEN OPPOSED TO SLOT PORTION 102 OF MAGNETIC MOBILE OBJECT 100

(b) VARIANCE OF TEMPERATURE CHARACTERISTIC (ROOM TEMPERATURE→150°C) OF SIGNAL A WHEN OPPOSED TO SLOT PORTION 102 OF MAGNETIC MOBILE OBJECT 100

MAGNETIC POSITION DETECTION APPARATUS

BACKGROUND OF THE INVENTION

1. Field of the Invention

The present invention relates to a magnetic position detection apparatus that magnetically detects a movement of a magnetic mobile object.

2. Background Art

There is a detection apparatus formed of a magneto-electric converting element and a magnet to magnetically detect a movement of a magnetic mobile object. The magneto-electric converting element referred to herein means an element whose electric resistance value varies with a magnetic field applied thereto, such as an MR (Magneto-Resistance) element. Because a magnetic field to be applied to the magneto-electric converting element by the magnet varies in association with a movement of the magnetic mobile object opposed to the magnet, the movement of the magnetic mobile object can be detected as a variance of the electric resistance value.

For example, a magnetic position detection apparatus disclosed in Japanese Patent No. 3682052 (Patent Document 1) is, as is shown in FIG. 19, provided to be spaced apart from a magnetic mobile object 500, which has a radially-protruding tooth portion on a circumference thereof and rotates in a circumferential direction, above a plane surface of the magnetic mobile object 500. The magnetic position detection apparatus includes a processing circuit portion 502 having a bridge circuit formed of first and second magneto-electric converting elements 501a and 501b, a magnet 503 that applies a magnetic field to the first and second magneto-electric converting elements 501a and 501b in a direction of a rotational axis line 504 of the magnetic mobile object 500, and a flux guide 505. When viewed along the direction of the rotational axis line 504, the second magneto-electric converting element 501b is disposed substantially on a center line in a circumferential width dimension of the magnet 503 while the first magneto-electric converting element 501a is displaced toward the magnetic mobile object 500 with respect to the second magneto-electric converting element 501b. Owing to this configuration, a differential output is obtained from outputs of the first and second magneto-electric converting elements 501a and 501b.

Further, the flux guide 505 made of a magnetic material is provided between the processing circuit portion 502 and the magnet 503 to prevent dispersion of a magnetic flux. The flux guide 505 has a pair of protrusions mutually opposing with a spacing in the circumferential direction of the magnetic mobile object 500. The second magneto-electric converting element 501b is disposed substantially on a center line between a pair of the protrusions. The first magneto-electric converting element 501a is disposed on the side of one of the protrusions.

Patent Document 1: Japanese Patent No. 3682052

According to the magnetic position detection apparatus in the related art disclosed in Patent Document 1, the bridge circuit is formed of the first and second magneto-electric converting elements 501a and 501b and, as is shown in FIGS. 20A and 20B, the first and second magneto-electric converting elements 501a and 502a are disposed with a spacing N. Accordingly, there is a difference between times at which the first and second magneto-electric converting elements 501a and 501b are opposed to a tooth portion or a slot portion of the magnetic mobile object 500 in association with a movement of the magnetic mobile object 500. This time difference gives rise to a phase difference in variance of the electric resistance values of the respective magneto-electric converting elements 501a and 501b. Hence, a differential output of the bridge circuit varies more abruptly than in a case where the bridge circuit is formed of a single magneto-electric converting element (the other one is a resistor made of non-magnetic metal). Spatial resolution can be thus enhanced.

Incidentally, in a case where the bridge circuit is formed of a plurality of magneto-electric converting elements, when the electric resistance values of the respective magneto-electric converting elements are not equal, that is, in a case where detection sensitivities to a magnetic field of the respective magneto-electric converting elements and a magnetic field to be applied thereto are not the same, such differences appear as a differential output of the bridge circuit.

For example, in a case where magneto-electric converting elements have magnetic anisotropy, the sensitivity varies with a change of an angle at which the magnetic field is applied to the magneto-electric converting elements. Even when the magnetic position detection apparatus is present solely and not opposed to a magnetic mobile object, sensitivities of the respective magneto-electric converting elements differ due to a difference in angle at which the magnetic field is applied to the respective magneto-electric converting elements by the magnet. When magnetic anisotropy varies depending on performance of the magneto-electric converting elements, such a variance in magnetic anisotropy is reflected on a differential output of the bridge circuit formed of a plurality of the magneto-electric converting elements, thereby causing a variance of the differential output.

In a case where a magnetic position detection apparatus having a bridge circuit formed of a plurality of magneto-electric converting elements as in Patent Document 1 above is manufactured, a magnetic characteristic (sensitivity) of the magneto-electric converting elements and a combining position of the magneto-electric converting elements and the magnet (a magnetic field applied to the respective magneto-electric converting elements) vary from apparatus to apparatus in manufacturing. Accordingly, a variance of the sensitivity together with a variance of the magnetic field increases a variance of the differential output of the bridge circuit in comparison with cases where the bridge circuit is formed of a resistor made of non-magnetic metal or where the bridge circuit is formed of a single magneto-electric converting element and a resistor made of non-magnetic metal. The manufacturing variances may be controlled strictly or adjustments may be performed during the fabrication sequence as countermeasures. However, either countermeasure makes the manufacturing difficult and further increases the manufacturing costs.

Also, in a case where sensitivities differ among a plurality of magneto-electric converting elements forming the bridge circuit as described above, a difference in sensitivity also appears for temperatures. Because a temperature characteristic of a differential output of the bridge circuit is large, the temperature characteristic varies considerably.

SUMMARY OF THE INVENTION

The invention therefore has an object to provide an inexpensive magnetic position detection apparatus by reducing a variance of a signal and thereby facilitating the manufacturing and further to improve characteristics of the magnetic position detection apparatus.

A magnetic position detection apparatus according to one aspect of the invention includes a substrate, a magnet, a bridge circuit, and a detection circuit. The bridge circuit includes first and second magneto-electric converting elements. The first and second magneto-electric converting elements are provided on the substrate and electric resistance values thereof vary with a variance of a magnetic field in association with a movement of a magnetic mobile object. The detection circuit detects a movement of the magnetic mobile object on the basis of a differential output of the bridge circuit. The second magneto-electric converting element is, when viewed along a magnetization direction of the magnet, disposed on or in a vicinity of a first straight line passing through a center point of a magnetic pole of the magnet and parallel to a straight line perpendicular to the magnetization direction of the magnet and also perpendicular to a movement direction of the magnetic mobile object. The first magneto-electric converting element is disposed in such a manner that, when not opposed to the magnetic mobile object, a component in a substrate of a magnetic field to be applied thereto is substantially same as a component in a substrate of a magnetic field to be applied to the second magneto-electric converting element.

According to the configuration above, when the magnetic position detection apparatus is present solely and not opposed to the magnetic mobile object, owing to the locations of the first and second magneto-electric converting elements, electric resistance values of the bridge circuit formed of the first and second magneto-electric converting elements are in balance. It thus becomes possible to suppress a variance of an output signal of the magnetic position detection apparatus in response to a manufacturing variance, such as a variance of magnetic characteristics of the magneto-electric converting elements and a variance of combining positions of the magneto-electric converting elements and the magnet in comparison with the related art. The magnetic position detection apparatus can be therefore manufactured more readily at a lower cost. Further, it becomes possible to improve a characteristic relating to sensitivities of the magneto-electric converting elements, such as, in particular, a temperature characteristic of a differential output of the bridge circuit.

The foregoing and other object, features, aspects, and advantages of the present invention will become more apparent from the following detailed description of the present invention when taken conjunction with the accompanying drawings.

DESCRIPTION OF THE PREFERRED EMBODIMENTS

Hereinafter, embodiments of the invention will be described in detail with reference to the drawings.

First Embodiment

Figure 1:
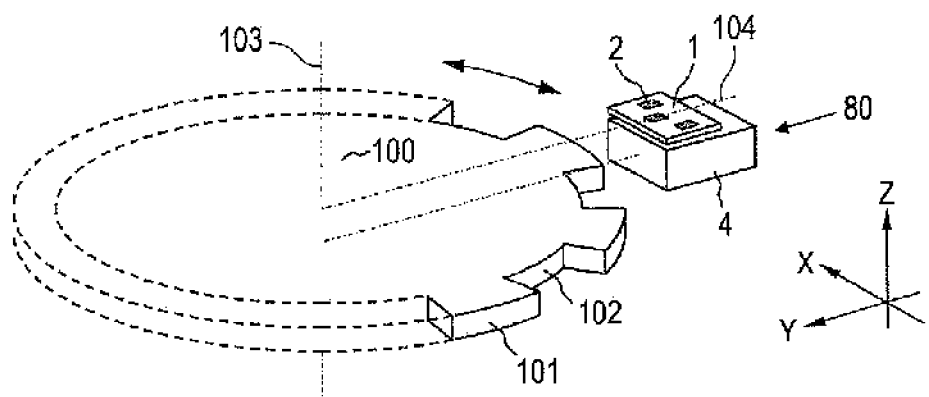
FIG. 1 is a perspective view showing a magnetic position detection apparatus according to a first embodiment of the invention.

FIG. 1 shows an example where a magnetic position detection apparatus 80 according to a first embodiment of the invention is disposed relative to a magnetic mobile object 100.

The magnetic mobile object 100 is a substantially disc-shaped magnetic object rotating about a rotation axis (center axis) 103. A radially-protruding tooth portion 101 and a radially-recessed slot portion 102 are formed alternately all along the circumference of the magnetic mobile object 100.

In order to detect a movement of the magnetic mobile object 100, the magnetic position detection apparatus 80 is disposed with a predetermined spacing from the magnetic mobile object 100. The magnetic position detection apparatus 80 includes a substrate 1, a bridge circuit 20 including a magneto-electric converting element 2 (see FIGS. 3A and 3B), a detection circuit 30 (see FIGS. 3A and 3B), and a magnet 4. The bridge circuit 20 has first through fourth magneto-electric converting elements 2a through 2d (see FIGS. 2A and 2B) formed on the substrate 1. The first through fourth magneto-electric converting elements 2a through 2d are hereinafter also referred to collectively as the magneto-electric converting element 2 or generally as the magneto-electric converting elements 2.

Figure 2A:
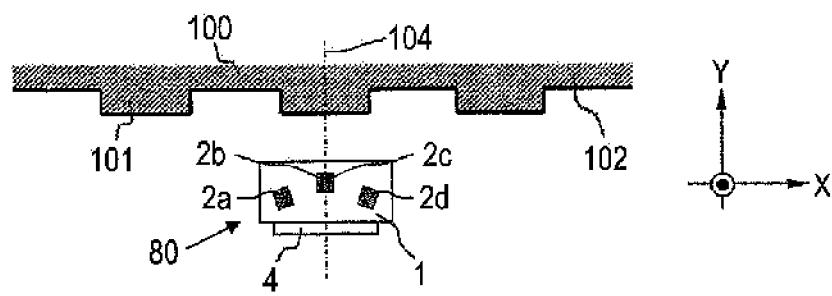
FIGS. 2A and 2B are plan views of the magnetic position detection apparatus of FIG. 1, FIG. 2A showing locations of a substrate and a magnet and FIG. 2B showing, in enlargement, locations of first through fourth magneto-electric converting elements by way of example.
Figure 2B:
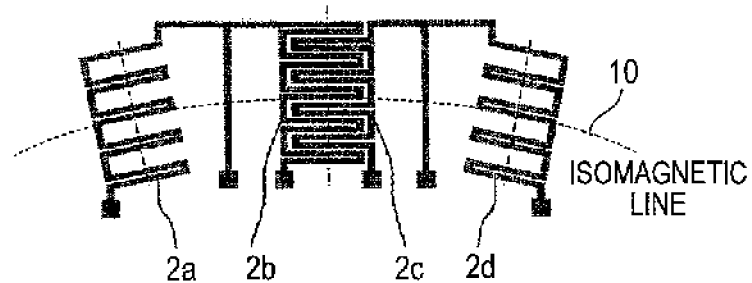

FIGS. 2A and 2B are plan views of the magnetic position detection apparatus 80 according to the first embodiment of the invention. FIG. 2A shows locations of the substrate 1 and the magnet 4 and FIG. 2B shows, in enlargement, locations of the first through fourth magneto-electric converting elements 2a through 2d by way of example.

Referring to FIG. 1 and FIG. 2A, a surface of the substrate 1 is disposed substantially perpendicularly to a magnetization direction of the magnet 4 and the magneto-electric converting elements 2a through 2d are formed on the substrate 1. The second and third magneto-electric converting elements 2b and 2c are disposed on a first straight line 104 that passes through a center point of a magnetic pole of the magnet 4 and is parallel to a straight line perpendicular to the magnetization direction of the magnet 4 and also perpendicular to a movement direction of the magnetic mobile object 100. In FIG. 1 and FIGS. 2A and 2B, the magnetization direction of the magnet 4 is a Z direction, the movement direction of the magnetic mobile object 100 is an X direction, and the first straight line 104 is a Y direction. With the configuration as above, when the magnetic position detection apparatus 80 is not opposed to the magnetic mobile object 100, that is, when the magnetic position detection apparatus 80 is present solely, a distribution of a magnetic field having a component in the substrate 1 same as that of a magnetic field to be applied to the second and third magneto-electric converting elements 2b and 2c is an isomagnetic line 10 shown in FIG. 2B. The first and fourth magneto-electric converting elements 2a and 2d are disposed on the isomagnetic line 10.

According to the configuration of the first embodiment, when the magnetic position detection apparatus 80 is present solely, all the first through fourth magneto-electric converting elements 2a through 2d are disposed in the same magnetic field (note, however, the component in the substrate 1). When sensitivities of the respective magneto-electric converting elements are equal in the same magnetic field, all the magneto-electric converting elements show equal electric resistance values. Normally, when the bridge circuit is formed of a magneto-electric converting element, the magneto-electric converting element is handled as a resistance wire. Hence, a meander-shaped wiring pattern may be formed in order to obtain a desired electric resistance value. Magnetic anisotropy of the magneto-electric converting element may appear depending on a shape of the wiring pattern. In this case, it becomes necessary to incline the wiring pattern not only to make sizes of a magnetic field equal but also to align the orientation of the magnetic field with respect to the longitudinal direction of the wire as is shown in FIG. 2B. In other words, to be in the same magnetic field, in addition to the size of the magnetic field, it is necessary to align the orientation of the magnetic field with respect to the magnetic anisotropic axis of the magneto-electric converting element.

Figure 3A:
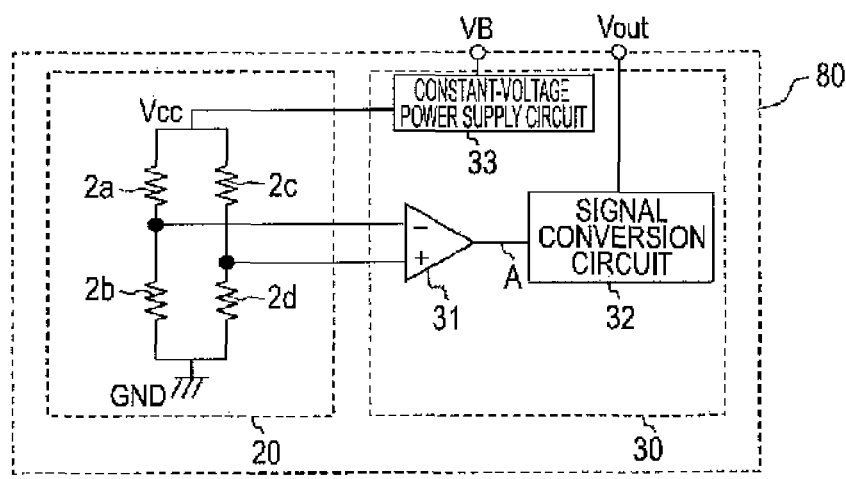
FIGS. 3A and 3B are circuit diagrams of the magnetic position detection apparatus of FIG. 1, FIG. 3A showing a bridge circuit and a detection circuit and FIG. 3B showing an example of the detection circuit.
Figure 3B:
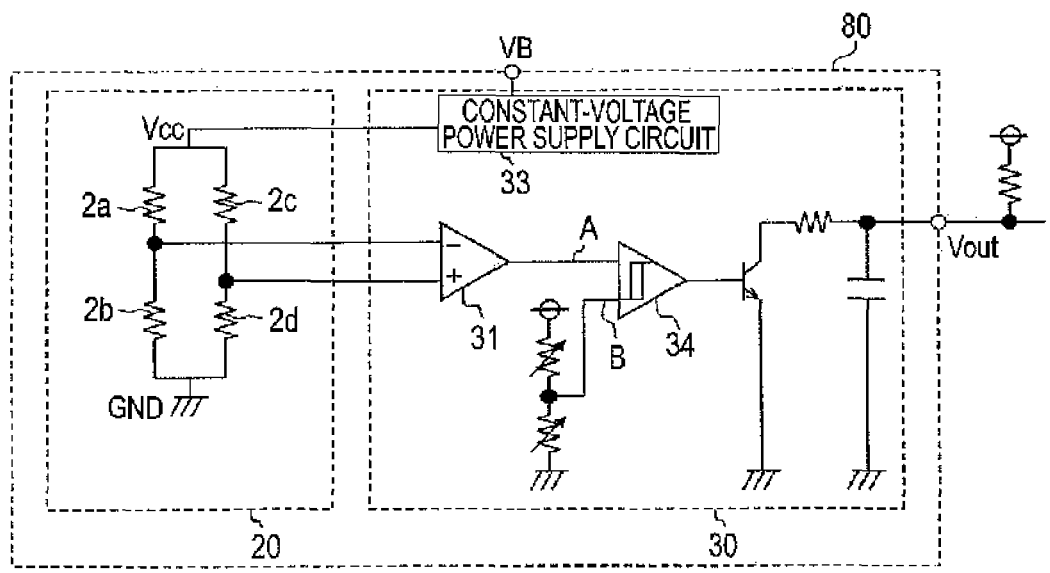

FIGS. 3A and 3B are circuit diagrams of the magnetic position detection apparatus 80 according to the first embodiment of the invention. FIG. 3A is a circuit diagram of the bridge circuit 20 and the detection circuit 30, and FIG. 3B is a circuit diagram showing an example of the detection circuit 30.

The bridge circuit 20 is formed by connecting the first and second magneto-electric converting elements 2a and 2b in series in this order between a power supply node Vcc and a grounding node GND and by connecting the third and fourth magneto-electric converting elements 2c and 2d in series in this order between the power supply node Vcc and the grounding node GND and in parallel to the series-connected first and second magneto-electric converting elements 2a and 2b. The detection circuit 30 is a circuit that detects a movement of the magnetic mobile object 100 on the basis of a differential output of the bridge circuit 20 and includes a differential amplifier circuit 31, a signal conversion circuit 32, and a constant-voltage power supply circuit 33. FIG. 3B is a circuit diagram showing an example of the signal conversion circuit 32 in the detection circuit 30. In the signal conversion circuit 32, a comparison circuit 34 converts an analog output of the differential amplifier circuit 31 to a digital output for an open collector output circuit to output a final output voltage Vout at "1" or "0".

Figure 4:
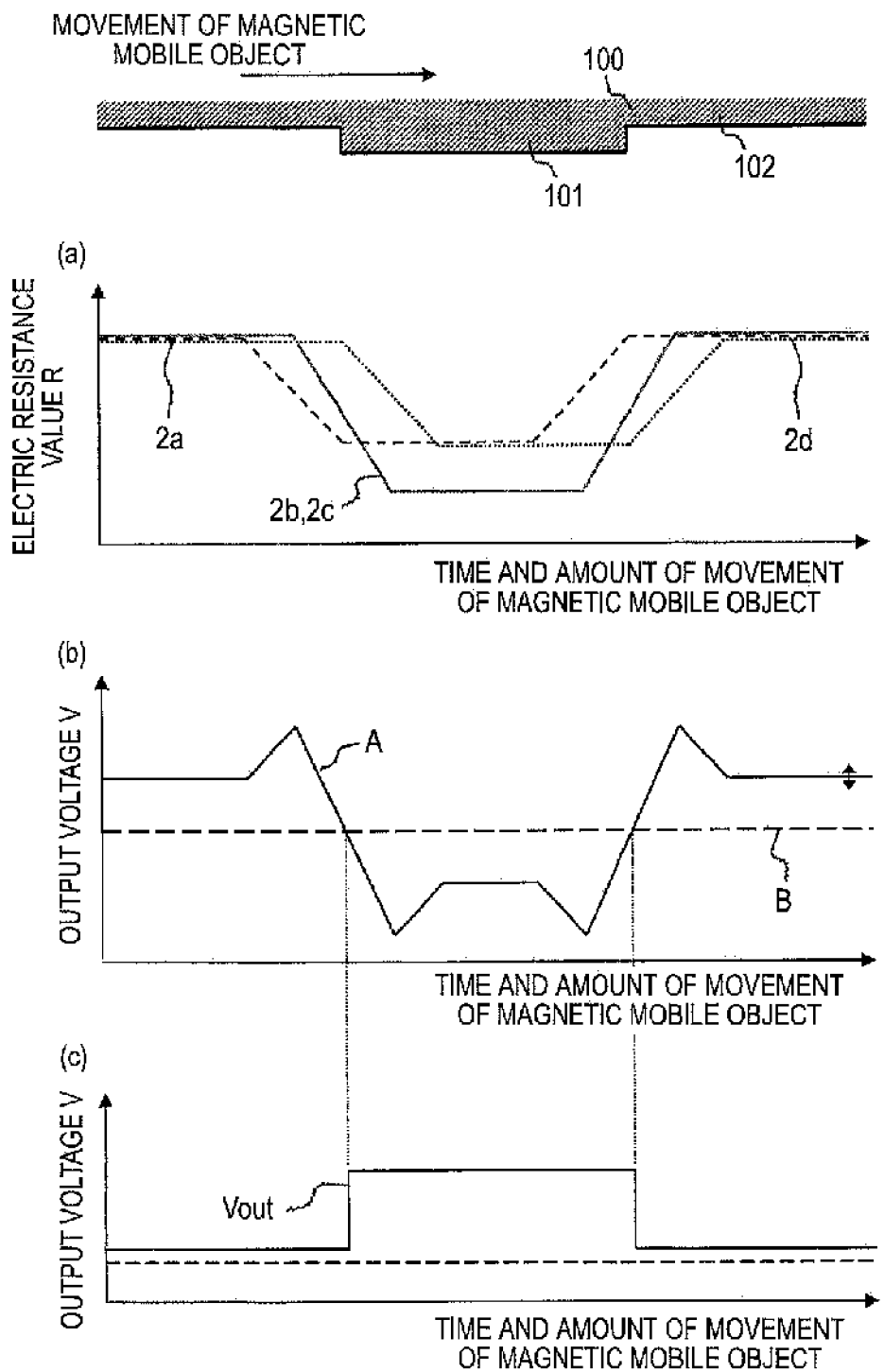
FIGS. 4(a) through 4(c) are, with a view of a magnetic mobile object for reference, operation waveform charts of the magnetic position detection apparatus of FIG. 1 in response to a movement of the magnetic mobile object, FIG. 4(a) showing variances of electric resistance values of the first through fourth magneto-electric converting elements, FIG. 4(b) showing a variance of an output voltage of a differential amplifier circuit, and FIG. 4(c) showing a variance of an output voltage of the magnetic position detection apparatus.

FIGS. 4(a) through 4(c) are operation waveform charts of the magnetic position detection apparatus 80 according to the first embodiment of the invention in response to a movement of the magnetic mobile object 100. With a view of the magnetic mobile object 100 for reference, FIG. 4(a) shows variances of the electric resistance values of the first through fourth magneto-electric converting elements 2a through 2d, FIG. 4(b) shows a variance of an output voltage A of the differential amplifier circuit 31, and FIG. 4(c) shows a variance of an output voltage Vout of the magnetic position detection apparatus 80.

Because a magnetic field applied from the magnet 4 to the respective magneto-electric converting elements 2 varies in association with a movement of the magnetic mobile object 100, each shows a variance of the electric resistance value as shown in FIG. 4(a). Normally, in order to confer a large variance of the magnetic field in association with a movement of the magnetic mobile object 100, the magnetic mobile object 100 adopts a shape in which a large step (a difference of distances to the tooth and slot portions from the magnetic position detection apparatus 80) is provided between the tooth portion 101 and the slot portion 102. In the first embodiment, too, a large step is provided along the idea described above. Then, an electric resistance value when opposed to the slot portion 102 is substantially equal to the electric resistance value when not opposed to the magnetic mobile object 100, that is, when the magnetic position detection apparatus 80 is present solely. Accordingly, the electric resistance values of the first through fourth magnetic-electric converting elements 2a through 2d when opposed to the slot portion 102 of the magnetic mobile object 100 are all equal. FIG. 4(b) shows a variance of the output voltage A of the differential amplifier circuit 31 in association with a movement of the magnetic mobile object 100. This waveform obtained by an output of the bridge circuit 20 indicates that the output voltage A is a voltage when the electric resistance values of the bridge circuit 20 are in balance when opposed to the slot portion 102 of the magnetic mobile object 100 whereas the electric resistance values of bridge circuit 20 become unbalanced when opposed to the tooth portion 101, which causes the voltage A to vary.

Comparative Example of First Embodiment

In order to describe advantages of the first embodiment of the invention, a comparative example of the first embodiment will now be described.

Figure 5A:
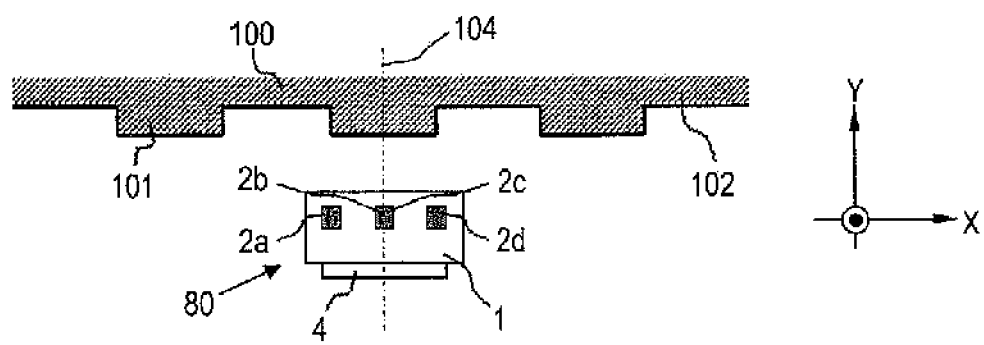
FIGS. 5A and 5B are plan views of a magnetic position detection apparatus as a comparative example of the first embodiment, FIG. 5A showing locations of a substrate and a magnet and FIG. 5B showing, in enlargement, locations of first through fourth magneto-electric converting elements byway of example.
Figure 5B:
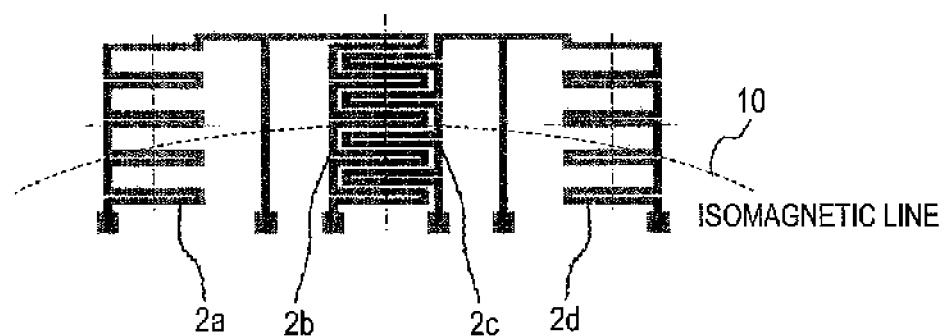

FIGS. 5A and 5B are plan views of a magnetic position detection apparatus according to a comparative example of the first embodiment of the invention. FIG. 5A shows locations of a substrate 1 and a magnet 4 and FIG. 5B shows, in enlargement, locations of first through fourth magneto-electric converting elements 2a through 2d by way of example.

The first embodiment is characterized in that when the magnetic position detection apparatus 80 is present solely and not opposed to the magnetic mobile object 100, the first and fourth magneto-electric converting elements 2a and 2d are disposed on the isomagnetic line 10 on which a component in the substrate 1 of a magnetic field to be applied thereto is the same as that of a magnetic field to be applied to the second and third magneto-electric converting elements 2b and 2c. On the contrary, according to the comparative example, the first and fourth magneto-electric converting elements 2a and 2d are disposed out of the isomagnetic line 10, so that a component in the substrate 1 of a magnetic field to be applied to the first and fourth magneto-electric converting elements 2a and 2d differs from that of a magnetic field to be applied to the second and third magneto-electric converting elements 2b and 2c. The rest of the configuration of the comparative example is the same as that of the first embodiment above.

Figure 6:
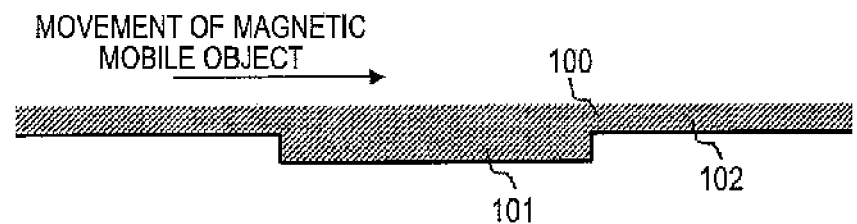
FIGS. 6(a) and 6(b) are, with a view of a magnetic mobile object for reference, operation waveform charts of the magnetic position detection apparatus of FIGS. 5A and 5B in response to a movement of the magnetic mobile object, FIG. 6(a) showing variances of electric resistance values of the first through fourth magneto-electric converting elements and FIG. 6(b) showing a variance of an output voltage of a differential amplifier circuit.
Figure 6:
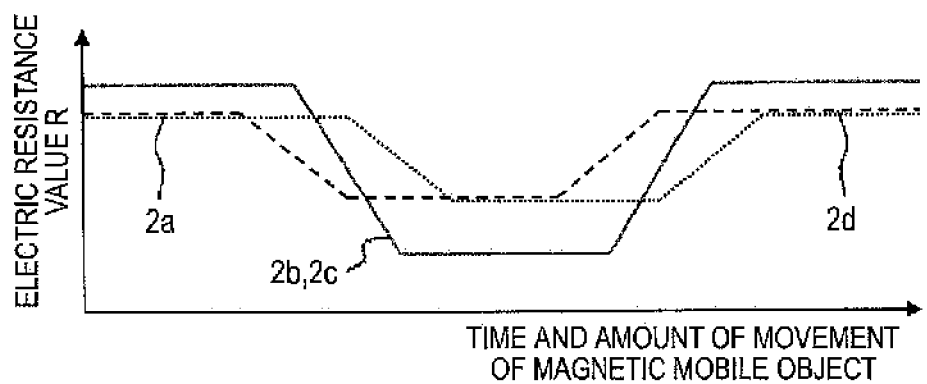
Figure 6:
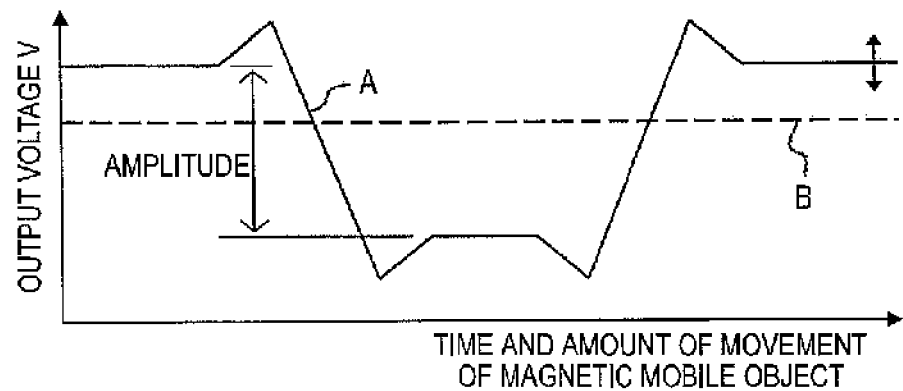

FIGS. 6(a) and 6(b) are operation waveform charts of the magnetic position detection apparatus according to the comparative example of the first embodiment of the invention in response to a movement of the magnetic mobile object 100. With a view of the magnetic mobile object 100 for reference, FIG. 6(a) shows a variance of the electric resistance values of the first through fourth magneto-electric converting elements 2a through 2d and FIG. 6(b) shows a variance of the output voltage A of the differential amplifier circuit 31.

In association with a movement of the magnetic mobile object 100, the respective magneto-electric converting elements 2 show variances of the electric resistance values as are shown in FIG. 6(a). In this comparative example, too, as in the first embodiment above, the electric resistance values when opposed to the slot portion 102 of the magnetic mobile object 100 are substantially equal to those when the magnetic position detection apparatus is present solely and not opposed to the magnetic mobile object 100. A difference from the first embodiment is that the electric resistance values of the first and fourth magneto-electric converting elements 2a and 2d when opposed to the slot portion 102 of the magnetic mobile object 100 are different from those of the second and third magneto-electric converting elements 2b and 2c. In other words, according to an operation of the comparative example, when opposed to the slot portion 102 of the magnetic mobile object 100, the electric resistance values of the bridge circuit 20 become unbalanced. FIG. 6(b) shows a variance of the output voltage A of the differential amplifier circuit 31 in association with a movement of the magnetic mobile object 100. It should be noted that a difference between a variation of the electric resistance values of the second and third magneto-electric converting elements 2b and 2c and a variation of the electric resistance values of the first and fourth electric resistance elements 2a and 2d is an amplitude of the output voltage A. In this comparative example, because sensitivities of the first and fourth magneto-electric converting elements 2a and 2d are lower than those in the first embodiment above, the difference becomes larger and the amplitude of the output voltage A becomes wider.

Figure 7:
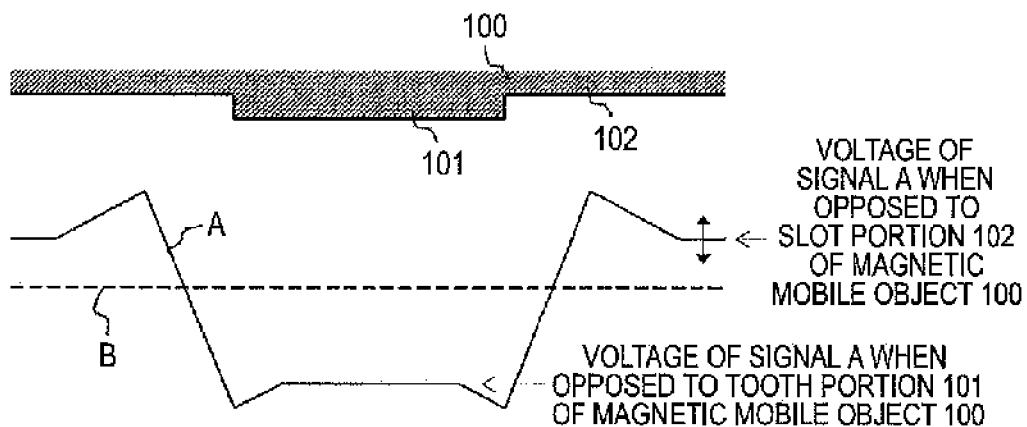
FIGS. 7(a) and 7(b) are, with a view of a magnetic mobile object and a chart showing a voltage of a signal for reference, characteristic comparison charts of the magnetic position detection apparatuses of the first embodiment and the comparative example of the first embodiment when opposed to a slot portion of the magnetic mobile object, FIG. 7(a) showing a variance of the output voltage of the differential amplifier circuit and FIG. 7(b) showing a variance of a temperature characteristic of the output voltage of the differential amplifier circuit.
Figure 7:
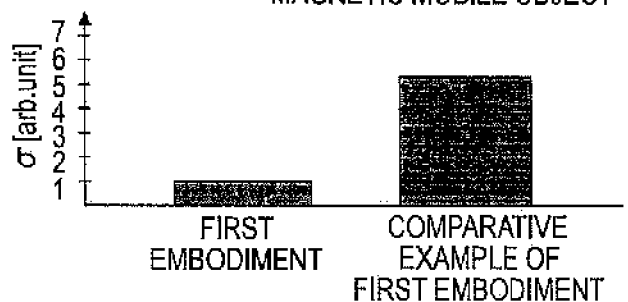
Figure 7:
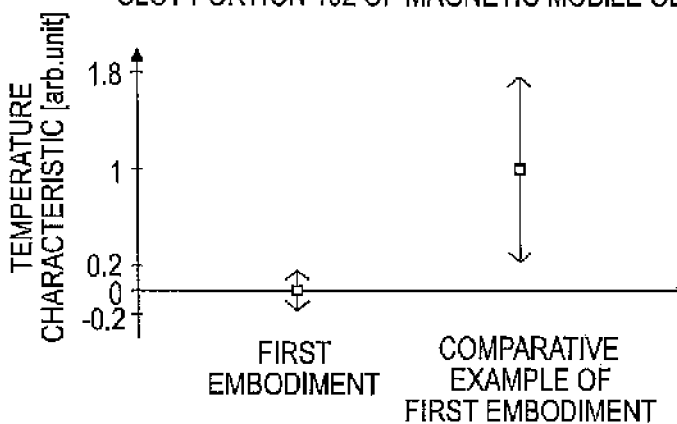

Characteristic Comparison Between First Embodiment and Comparative Example Thereof FIGS. 7(a) and 7(b) are characteristic comparison charts of the magnetic position detection apparatuses 80 of the first embodiment and the comparative example of the first embodiment. With a view of the magnetic mobile object 100 and a chart showing a voltage of a signal A for reference, FIG. 7(a) shows a variance of the output voltage A of the differential amplifier circuit 31 and FIG. 7(b) shows a variance of a temperature characteristic of the output voltage A of the differential amplifier circuit 31 when opposed to the slot portion 102 of the magnetic mobile object 100.

A difference between the first embodiment and the comparative example of the first embodiment is a state of balance of the electric resistance values of the bridge circuit 20 when opposed to the slot portion 102 of the magnetic mobile object 100, and this state appears in the output voltage A of the differential amplifier circuit 31. Accordingly, a variance of the output voltage A and a variance of the temperature characteristic of the output voltage A were evaluated. For evaluation, 30 substrates 1 each provided with the magneto-electric converting elements 2 and 10 aluminum holders each enclosing the magnet 4 and used to combine the substrate 1 and the magnet 4 together were prepared. Samples were fabricated by successively combining the 30 substrates 1 with the respective aluminum holders and an output voltage A was measured. FIG. 7(a) shows an average value of variances of the output voltage A and FIG. 7(b) shows an average value of variances of a variation of the output voltage A (temperature characteristic of the output voltage A) from room temperature to 150° C. It is understood from FIG. 7(a) that a variance of the output voltage A is smaller in the first embodiment. Also, it is understood from FIG. 7(b) that there is little temperature characteristic of the output voltage A in the first embodiment whereas there is a temperature characteristic of the output voltage A in the comparative example and further that a variance of the temperature characteristic of the output voltage A is smaller in the first embodiment. This is because balance of the electric resistance values of the bridge circuit 20 when opposed to the slot portion 102 of the magnetic mobile object 100 is so good in the first embodiment that the bridge circuit 20 becomes able to function sufficiently, which prevents a variance of the magnetic characteristic of the magneto-electric converting elements 2 from appearing in the output voltage A. In view of the foregoing evaluation, there can be confirmed an advantage that components in the substrate 1 of a magnetic field to be applied to the respective magneto-electric converting elements 2 forming the bridge circuit 20 when opposed to the slot portion 102 of the magnetic mobile object 100 or when the magnetic position detection apparatus 80 is present solely can be the same.

Second Embodiment

A magnetic position detection apparatus 80 according to a second embodiment of the invention is an improved example of the first embodiment above and additionally includes a flux guide between a magneto-electric converting element 2 and a magnet 4.

Figure 8A:
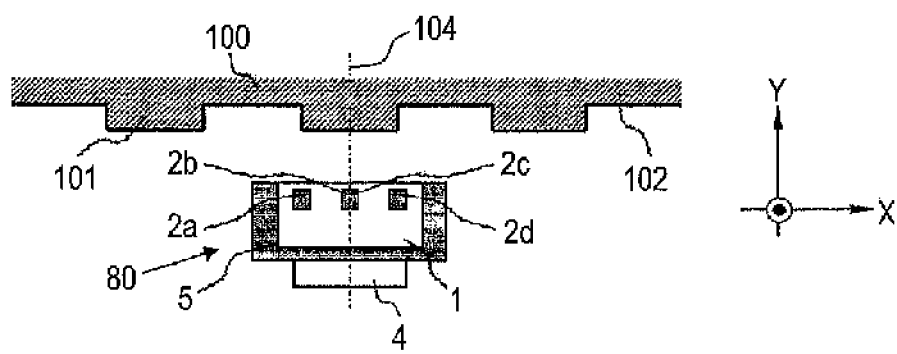
FIGS. 8A through 8C show a magnetic position detection apparatus according to a second embodiment of the invention, FIG. 8A being a plan view showing locations of a substrate, a magnet, and a flux guide, FIG. 8B being a plan view showing, in enlargement, locations of first through fourth magneto-electric converting elements by way of example, and FIG. 8C being a side view showing locations of the substrate, the magnet, and the flux guide by way of example.
Figure 8B:
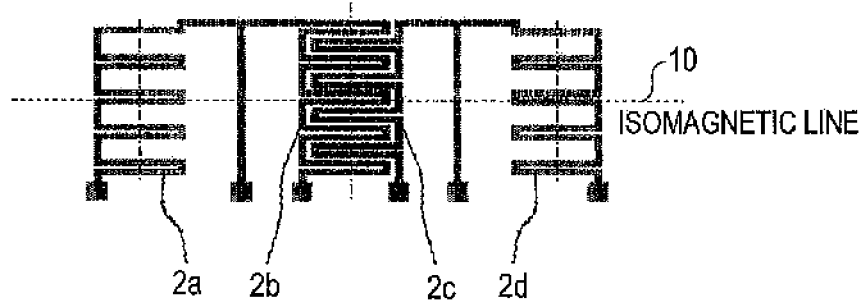
Figure 8C:
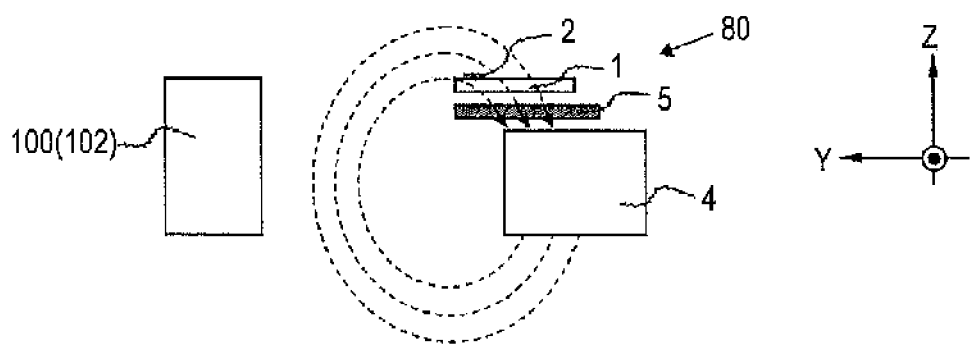

FIGS. 8A through 8C are plan views and a side view of the magnetic position detection apparatus 80 according to the second embodiment of the invention. FIG. 8A is a plan view showing locations of a substrate 1, a magnet 4, and a flux guide 5. FIG. 8*b* is a plan view showing, in enlargement, locations of first through fourth magneto-electric converting elements 2*a* through 2*d* by way of example. FIG. 8C is a side view showing locations of the substrate 1, the magnet 4, and the flux guide 5 by way of example.

Referring to FIGS. 8A and 8B, a surface of the substrate 1 is substantially perpendicular to a magnetization direction of the magnet 4 and the flux guide 5 has a surface perpendicular to the magnetization direction of the magnet 4. When viewed along the magnetization direction of the magnet 4, the flux guide 5 is symmetrical with respect to a first straight line 104. The second and third magneto-electric converting elements 2*b* and 2*c* are disposed on the first straight line 104. The first and fourth magneto-electric converting elements 2*a* and 2*d* are disposed on an isomagnetic line 10 on which a component in the substrate 1 of a magnetic field to be applied thereto is the same as that of a magnetic field to be applied to the second and third magneto-electric converting elements 2*b* and 2*c* when not opposed to the magnetic mobile object 100, that is, when the magnetic position detection apparatus 80 is present solely. Because of the presence of the flux guide 5, the isomagnetic line 10 is linear as is shown in FIG. 8B and the first and fourth magneto-electric converting elements 2*a* and 2*d* are disposed closer to the magnetic mobile object 100 than in the first embodiment above with the wiring pattern of the magneto-electric converting elements being hardly inclined. Further, referring to FIG. 8C, a center point of the flux guide 5 is disposed closer to the magnetic mobile object 100 than a center point of the magnetic pole of the magnet 4. It should be noted that the flux guide 5 is disposed in a +Y direction with respect to the magnet 4 in FIGS. 8A through 8C.

According to the configuration of the second embodiment, it is necessary that the plane dimension of the flux guide 5 is larger than a plane including all the magneto-electric converting elements 2. The flux guide 5 is to play a role of the magnetic pole of the magnet 4 on the side of the flux guide 5 and the flux guide 5 is thus enabled to control the magnetic field distribution on the periphery of the magneto-electric converting elements 2. In other words, the magneto-electric converting elements 2 are not disposed in a magnetic field directly from the magnet 4 but disposed, via the flux guide 5, in a magnetic field distribution formed by the flux guide 5.

Further, according to the configuration of the second embodiment, the flux guide 5 has an advantage of shifting the magnetic pole of the magnet 4 on the side of the flux guide 5 closer to the magnetic mobile object 100. Incidentally, in order to obtain a differential output of the bridge circuit 20 at a wider amplitude in response to a movement of the magnetic mobile object 100, it is desirable to bring the magnetic position detection apparatus 80 to the closer proximity to the magnetic mobile object 100. By taking the foregoing into consideration, the magneto-electric converting element 2 is disposed at a position closer to the magnetic mobile object 100 and this configuration is achieved by shifting the magnetic pole of the magnet 4 on the side of the magneto-electric converting element 2 closer to the magnetic mobile object 100.

Figure 9A:
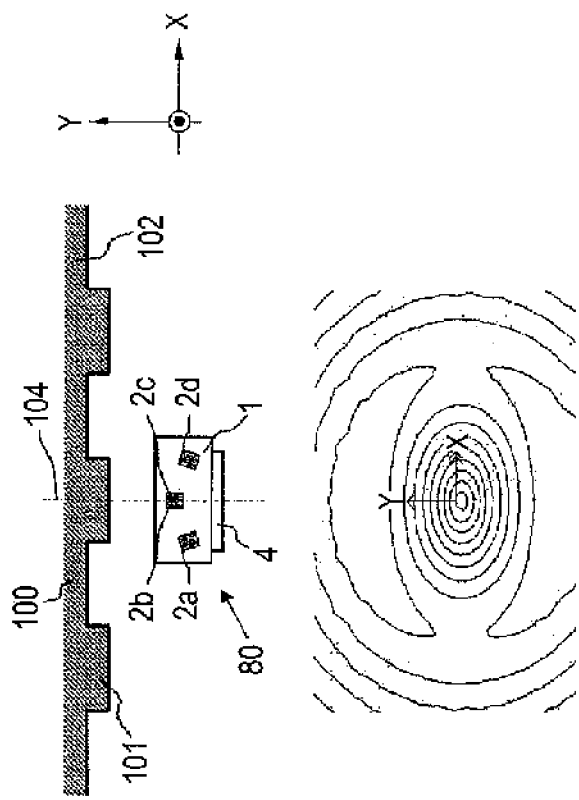
FIGS. 9A and 9B are charts of magnetic field distribution on substrate surface of the magnetic position detection apparatuses of the invention, FIG. 9A showing a magnetic field distribution in the second embodiment and FIG. 9B showing a magnetic field distribution in the first embodiment.
Figure 9B:
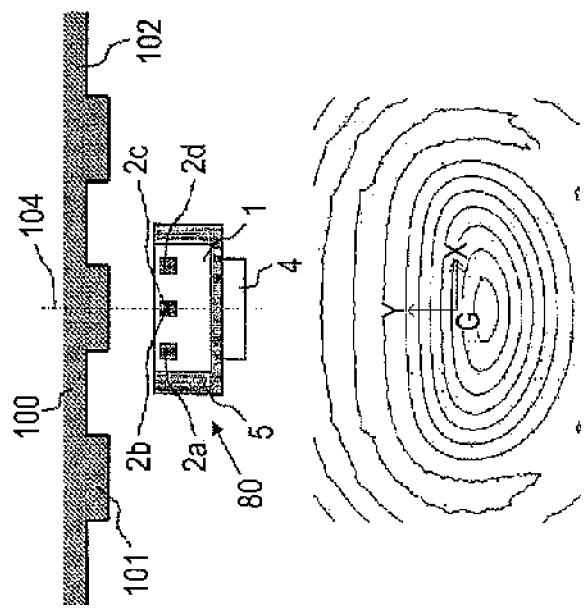

FIGS. 9A and 9B are charts of magnetic field distribution on the surface of the substrate 1 of the magnetic position detection apparatuses 80 of the invention. FIG. 9A is a magnetic field distribution chart of the second embodiment with the flux guide 5 and FIG. 9B is a magnetic field distribution chart of the first embodiment without the flux guide 5.

An advantage of the flux guide 5 provided in the second embodiment will now be described. As can be understood from the drawing, the flux guide 5 is of a rectangular shape when viewed along the magnetization direction of the magnet 4. Hence, by providing the flux guide 5 above the magnet 4, the magnetic field distribution on the surface of the substrate 1 takes substantially a rectangular shape. In addition, because the center point of the flux guide 5 is disposed closer to the magnetic mobile object 100 than the center point of the magnetic pole of the magnet 4, the magnetic field distribution shifts closer to the magnetic mobile object 100. An intention of the shape of the flux guide 5 is to form a linear portion in the isomagnetic line. For example, even when the magnetic field distribution on the surface of the substrate 1 moves due to a variance occurring when the magneto-electric converting element 2 and the magnet 4 are combined together, the second and third magneto-electric converting elements 2*b* and 2*c* and the first and fourth magneto-electric converting elements 2*a* and 2*d* hardly come out of the isomagnetic line. An intention of the location of the flux guide 5 is to provide the isomagnetic line on the surface of the substrate 1 closer to the magnetic mobile object 100. Owing to this configuration, as has been described above, it becomes possible to obtain a differential output of the bridge circuit 20 at a wider amplitude in response to a movement of the magnetic mobile object 100.

Each of the shape and the location of the flux guide 5 in the second embodiment is means of the present application. Each is means actually realized in a more effective manner to stabilize a differential output of the bridge circuit 20, which is an advantage of the application, by disposing a plurality of the magneto-electric converting elements 2 forming the bridge circuit 20 on the isomagnetic line on the surface of the substrate 1 when the magnetic position detection apparatus 80 is present solely. It should be noted, however, that the shape of the flux guide 5 has an advantage of adjusting the magnetic field distribution on the surface of the substrate 1 and the intention of the second embodiment described above is a mere example. Accordingly, in order to obtain a desired magnetic field distribution, the flux guide 5 is not necessarily of a rectangular shape and can be of an arbitrary shape.

Figure 10:
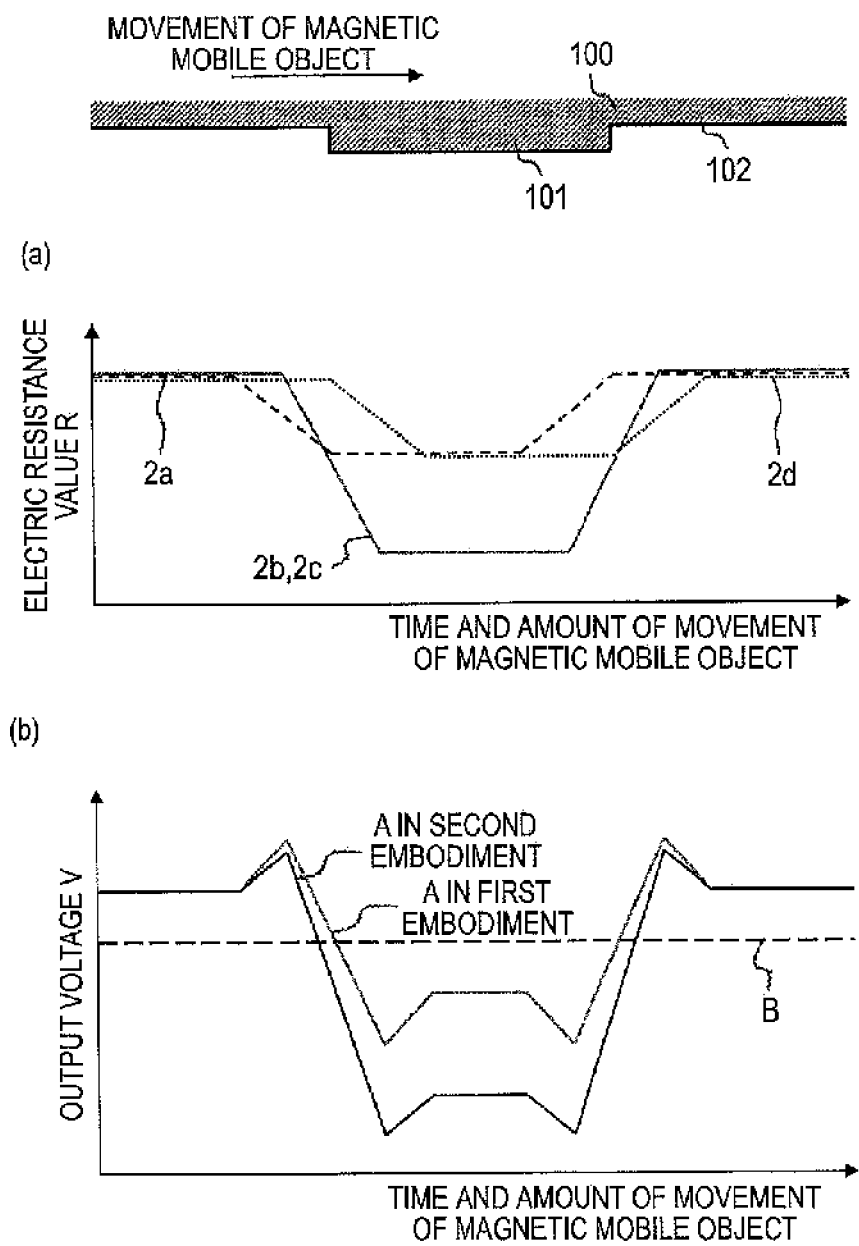
FIGS. 10(a) and 10(b) are, with a view of a magnetic mobile object for reference, operation waveform charts of the magnetic position detection apparatus of FIGS. 8A through 8C in response to a movement of the magnetic mobile object, FIG. 10(a) showing variances of electric resistance values of first through fourth magneto-electric converting elements and FIG. 10(b) showing variances of output voltages of the differential amplifier circuits.

FIGS. 10(*a*) and 10(*b*) are operation waveform charts of the magnetic position detection apparatus 80 according to the second embodiment of the invention in response to a movement of the magnetic mobile object 100. With a view of the magnetic mobile object 100 for reference, FIG. 10(*a*) shows variances of the electric resistance values of the first through fourth magneto-electric converting elements 2*a* through 2*d* and FIG. 10(*b*) shows a variance of an output voltage A of the differential amplifier circuit 31.

Referring to FIG. 10(*a*), the electric resistance values of the first through fourth magneto-electric converting elements 2*a* through 2*d* when opposed to the slot portion 102 of the magnetic mobile object 100 are all equal. Also, owing to the location of the flux guide 5, the magneto-electric converting element 2 is disposed closer to the magnetic mobile object 100. Hence, in comparison with the first embodiment above, variances of the electric resistance values of the second and third magneto-electric converting elements 2*b* and 2*c* are particularly noticeable. Hence, the amplitude of the output voltage A of the differential amplifier circuit 31 becomes wider in FIG. 10(*b*).

Third Embodiment

A magnetic position detection apparatus 80 according to a third embodiment of the invention includes, as with the second embodiment above, a flux guide 5 made of a magnetic material between a magneto-electric converting element 2 and a magnet 4. The flux guide 5 is, however, of a shape different from the shape of the counterpart in the second embodiment above and it is an improved example of the counterpart in the second embodiment above.

Figure 11:
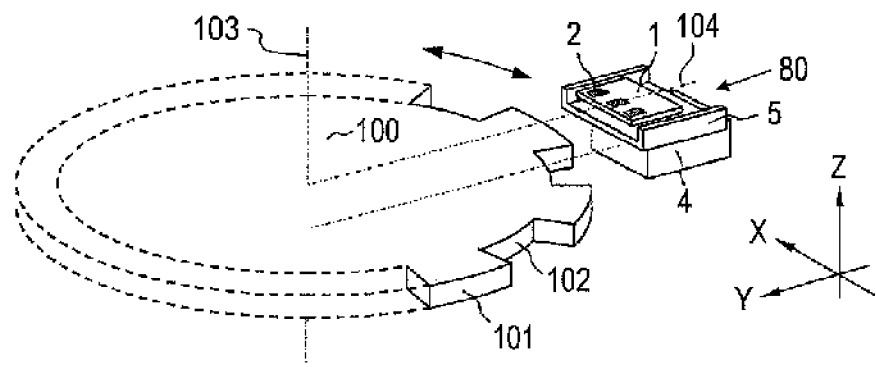
FIG. 11 is a perspective view of a magnetic position detection apparatus according to a third embodiment of the invention.

FIG. 11 is a perspective view of the magnetic position detection apparatus 80 according to the third embodiment of the invention showing a location thereof relative to a magnetic mobile object 100 by way of example.

Figure 12:
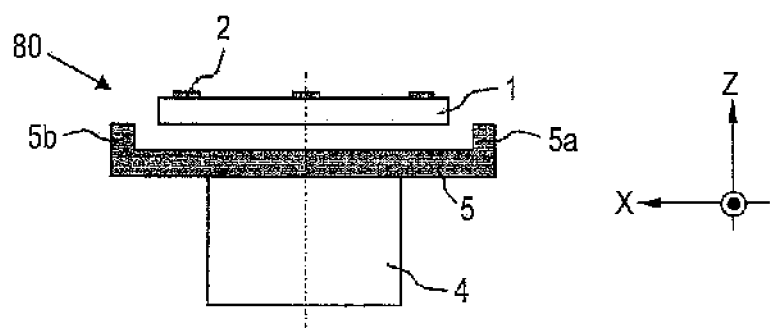
FIG. 12 is a side view showing locations of a substrate, a magnet, and a flux guide of the magnetic position detection apparatus of FIG. 11 by way of example.

FIG. 12 is a side view showing locations a substrate 1, a magnet 4, and a flux guide 5 of the magnetic position detection apparatus 80 according to the third embodiment of the invention by way of example.

As are shown in FIG. 11 and FIG. 12, a surface of the substrate 1 is substantially perpendicular to a magnetization direction of the magnet 4 and the flux guide 5 has a surface perpendicular to the magnetization direction of the magnet 4 and includes first and second protrusions 5*a* and 5*b* protruding in a direction to come closer to a virtual plane, which is the surface of the substrate 1 extended virtually. When viewed along the magnetization direction of the magnet 4, the first and second protrusions 5*a* and 5*b* are symmetrical with respect to the first straight line 104 and provided with a spacing in a direction perpendicular to the first straight line 104, and second and third magneto-electric converting elements 2*b* and 2*c* are disposed on the first straight line 104 and substantially on a center line between a pair of the protrusions 5*a* and 5*b*. The first and fourth magneto-electric converting elements 2*a* and 2*d* are disposed on an isomagnetic line on which a component in the substrate 1 of a magnetic field to be applied thereto is the same as that of a magnetic field to be applied to the second and third magneto-electric converting elements 2*b* and 2*c* when the magnetic position detection apparatus 80 is present solely and not opposed to the magnetic mobile object 100. The first and fourth magneto-electric converting elements 2*a* and 2*d* are disposed on the side closer to the first and second protrusions 5*a* and 5*b* than the second and third magneto-electric converting elements 2*b* and 2*c*, respectively.

Figure 13:
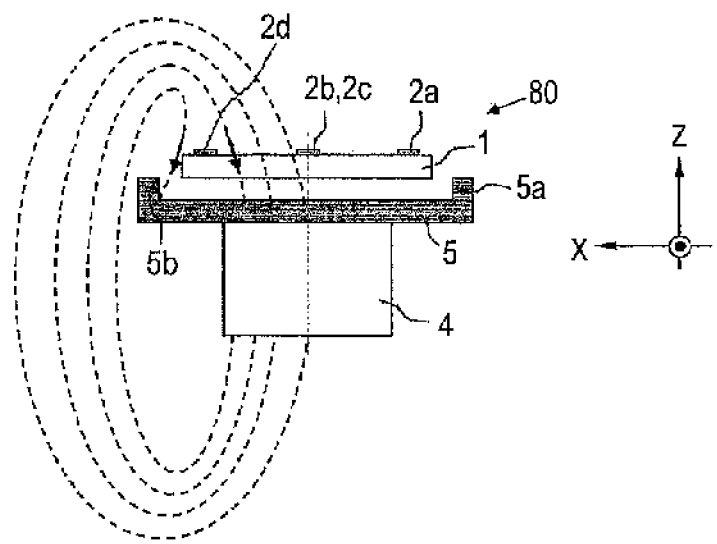
FIG. 13 is a conceptual view used to describe an advantage of the flux guide of the magnetic position detection apparatus of FIG. 11.

FIG. 13 is a conceptual view used to describe an advantage of the flux guide 5 of the magnetic position detection apparatus 80 according to the third embodiment of the invention.

The flux guide 5 of the third embodiment has the first and second protrusions 5*a* and 5*b* and these protrusions 5*a* and 5*b* make a magnetic field distribution on the surface of the substrate 1 more preferable. For example, as is shown in FIG. 13 (a broken line indicates a magnetic flux), a magnetic flux heading toward the protrusion is formed in the vicinity of the protrusion. Hence, when viewed along the magnetization direction of the magnet 4, the direction of the magnetic flux changes to a direction perpendicular to the first straight line 104. Accordingly, the rectangular shape of the magnetic field distribution on the surface of the substrate 1 described in the second embodiment above takes a more square shape. For example, even when the magnetic field distribution on the surface of the substrate 1 moves due to a variance occurring when the magneto-electric converting element 2 and the magnet 4 are combined together, the second and third magneto-electric converting elements 2*b* and 2*c* and the first and fourth magneto-electric converting elements 2*a* and 2*d* hardly come out of the isomagnetic line.

Figure 14:
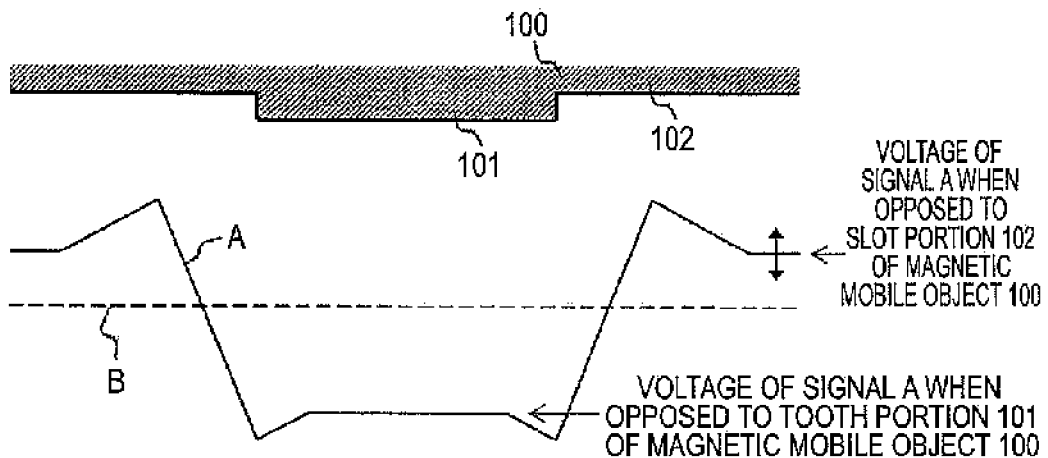
FIGS. 14(a) and 14(b) are, with a view of a magnetic mobile object and a chart showing a voltage of a signal for reference, characteristic comparative charts of the magnetic position detection apparatuses of the first, second, and third embodiments when opposed to a slot portion of the magnetic mobile object, FIG. 14(a) showing a variance of an output voltage of a differential amplifier circuit and FIG. 14(b) showing a variance of a temperature characteristic of the output voltage of the differential amplifier circuit.
Figure 14:
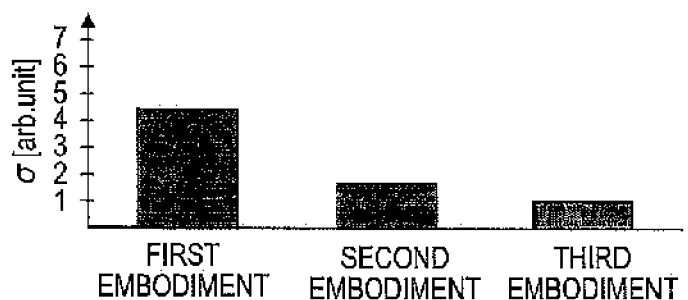
Figure 14:
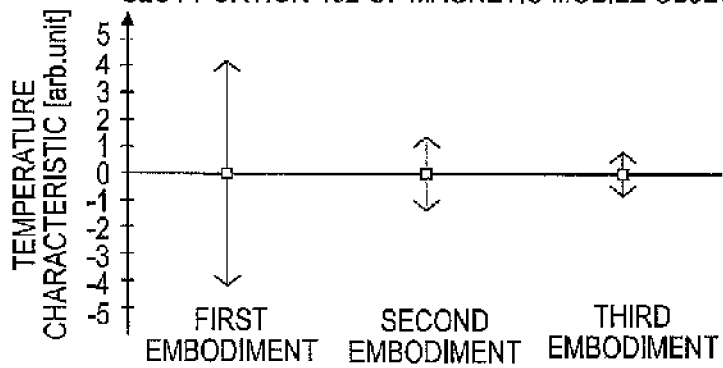

FIGS. 14(*a*) and 14(*b*) are characteristic comparison charts among the magnetic position detection apparatuses 80 of the first, second, and third embodiments. With a view of the magnetic mobile object 100 and a chart showing a voltage of a signal A for reference, FIG. 14(*a*) shows a variance of an output voltage A of a differential amplifier circuit 31 and FIG. 14(*b*) shows a variance of a temperature characteristic of the output voltage A of the differential amplifier circuit 31 when opposed to the slot portion 102 of the magnetic mobile object 100.

In any of the embodiments above, the electric resistance values of the bridge circuit 20 when opposed to the slot portion 102 of the magnetic mobile object 100 are in good balance owing to the means of the application. However, because the magnetic field distribution on the surface of the substrate 1 differs because of a difference of the respective configurations, each has different robustness against a manufacturing variance, such as a variance of the magnetic characteristic of the magneto-electric converting elements and a variance of the combined positions of the magneto-electric converting elements and the magnet. Accordingly, a variance of the output voltage A of the differential amplifier circuit 31 was actually evaluated in the same manner as in the first embodiment above (FIGS. 7(*a*) and 7(*b*)). FIG. 14(*a*) shows an average value of variances of the output voltage A and FIG. 14(*b*) shows an average value of variances of a variation of the output voltage A (temperature characteristic of the output voltage A) from room temperature to 150° C. According to FIG. 14(*a*), a variance of the output voltage A becomes larger in order of the third, second, and first embodiments. Also, according to FIG. 14(*b*), there is substantially no temperature characteristic of the output voltage A in any of the embodiments. However, a variance of the temperature characteristic of the output voltage A becomes larger in order of the third, second, and first embodiments. The robustness against a manufacturing variance is therefore the highest in the third embodiment.

Fourth Embodiment

A magnetic position detection apparatus 80 according to a fourth embodiment of the invention is a modification of the third embodiment above and it is an example of the basic configuration of the invention.

Figure 15A:
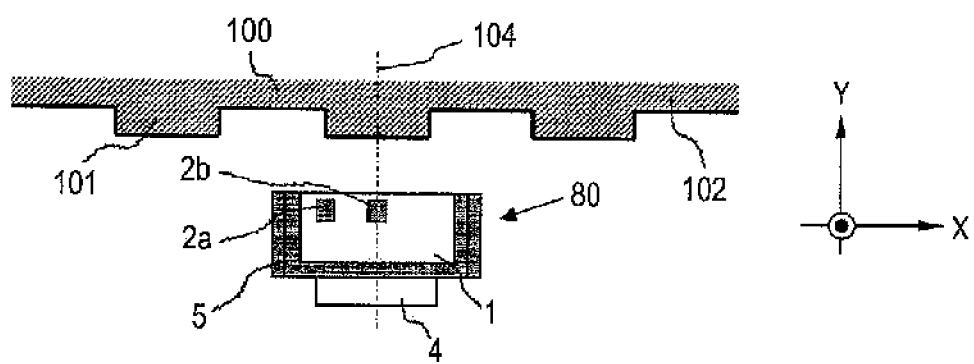
FIGS. 15A and 15B are plan views of a magnetic position detection apparatus according to a fourth embodiment of the invention, FIG. 15A showing locations of a substrate, a magnet, and a flux guide and FIG. 15B showing, in enlargement, locations of first through fourth magneto-electric converting elements by way of example.
Figure 15B:
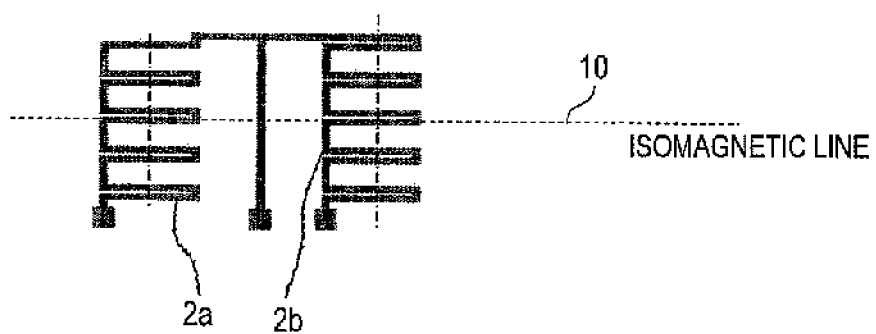

FIGS. 15A and 15B are plan views of the magnetic position detection apparatus 80 according to the fourth embodiment of the invention. FIG. 15A shows locations of a substrate 1, a magnet 4, and a flux guide 5 and FIG. 15B shows, in enlargement, locations of first and second magneto-electric converting elements 2a and 2b by way of example.

A magneto-electric converting element 2 of the fourth embodiment is of the same configuration as the magneto-electric converting element 2 described in the third embodiment above except that the third and fourth magneto-electric converting elements 2c and 2d are omitted.

Figure 16A:
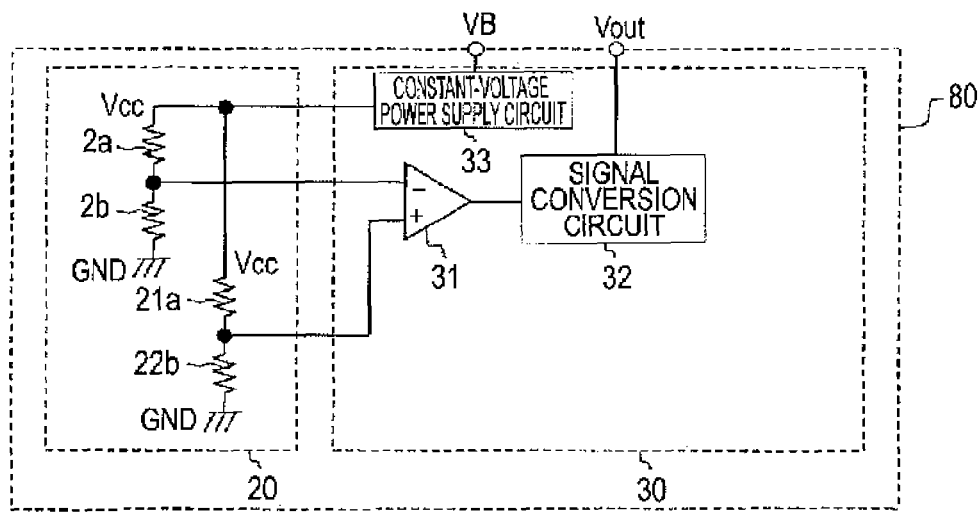
FIGS. 16A and 16B are circuit diagrams of the magnetic position detection apparatus of FIGS. 15A and 15B, FIG. 16A showing a bridge circuit and a detection circuit and FIG. 16B showing an example of the detection circuit.
Figure 16B:
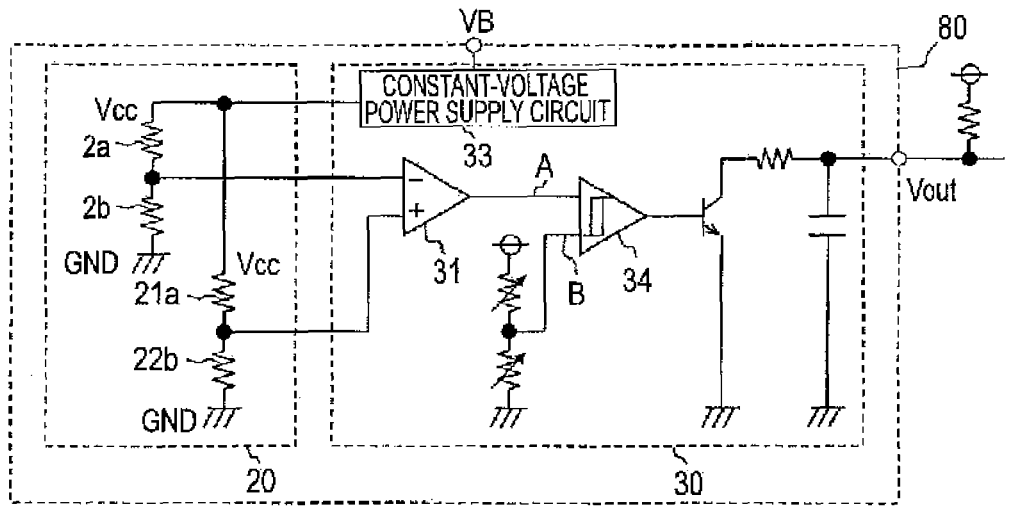

FIGS. 16A and 16B are circuit diagrams of the magnetic position detection apparatus 80 according to the fourth embodiment of the invention. FIG. 16A is a circuit diagram of a bridge circuit 20 and a detection circuit 30 and FIG. 16B is circuit diagram showing an example of the detection circuit 30.

Regarding the circuit of the fourth embodiment, two resistance wires 21a and 21b made of a non-magnetic metal are used instead of the third and fourth magneto-electric converting elements 2c and 2d in the circuit described in the first embodiment above to form the bridge circuit 20. A midpoint voltage of the series-connected two resistance wires 21a and 21b made of non-magnetic metal is set at a fixed value. On the contrary, a midpoint voltage of the series-connected first and second magneto-electric converting elements 2a and 2b varies with a variance of a magnetic field to be applied thereto. It thus becomes possible to detect a movement of a magnetic mobile object 100.

The fourth embodiment is a modification of the third embodiment above and the magneto-electric converting element 2 forming the bridge circuit 20 is formed of the first and second magneto-electric converting elements 2a and 2b by omitting the third and fourth magneto-electric converting elements 2c and 2d. This embodiment is therefore the fundamental (basic example) of the configuration of the bridge circuit 20. The same modification (basic example) may be also applied to the first and second embodiments above.

Fifth Embodiment

A magnetic position detection apparatus 80 according to a fifth embodiment of the invention includes, as in the third embodiment above, a flux guide 5 made of a magnetic material between a magneto-electric converting element 2 and a magnet 4. The flux guide 5 is, however, of a different shape from the counterpart in the third embodiment above and it is an improved example of the counterpart in the third embodiment above.

Figure 17:
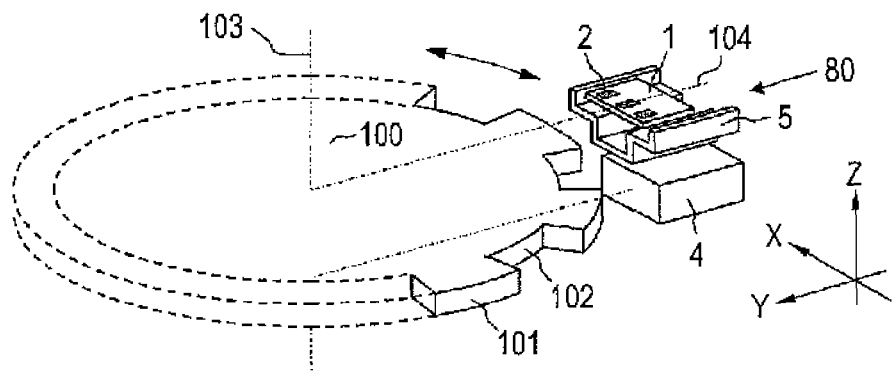
FIG. 17 is a perspective view of a magnetic position detection apparatus according to a fifth embodiment of the invention.

FIG. 17 is a perspective view of the magnetic position detection apparatus 80 according to the fifth embodiment of the invention to show a location thereof relative to a magnetic mobile object 100 by way of example.

Figure 18:
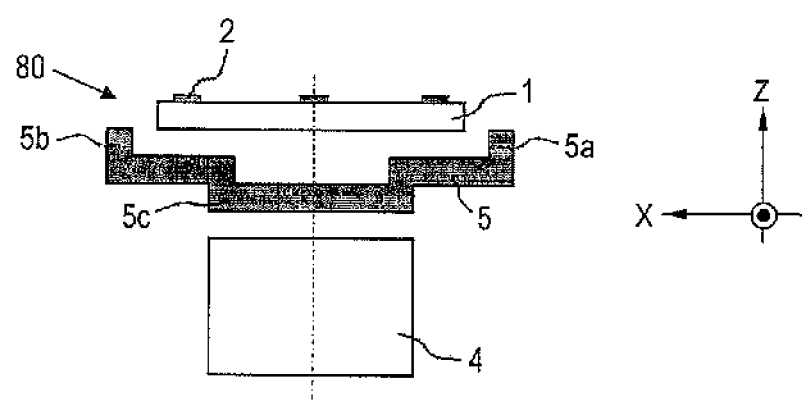
FIG. 18 is a side view showing locations of a substrate, a magnet, a flux guide of the magnetic position detection apparatus of FIG. 17 by way of example.
Figure 19:
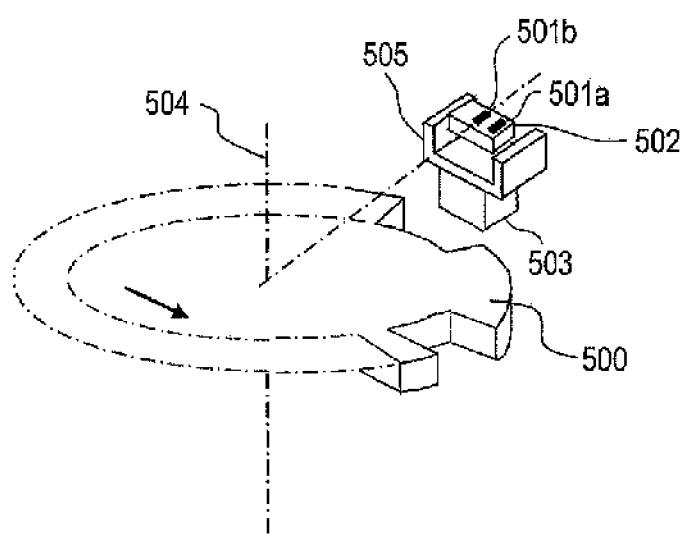
FIG. 19 is a perspective view of a magnetic position detection apparatus in the related art.
Figure 20A:
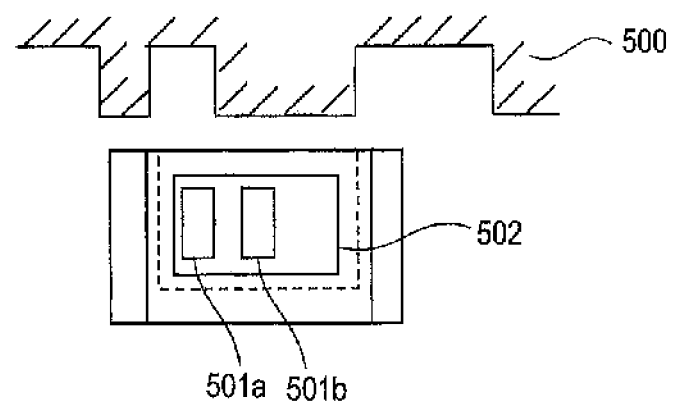
FIGS. 20A and 20B are plan views of the magnetic position detection apparatus of FIG. 19, FIG. 20A showing locations of a substrate, a magnet, and a flux guide and FIG. 20B showing, in enlargement, locations of first and second magneto-electric converting elements by way of example.
Figure 20B:
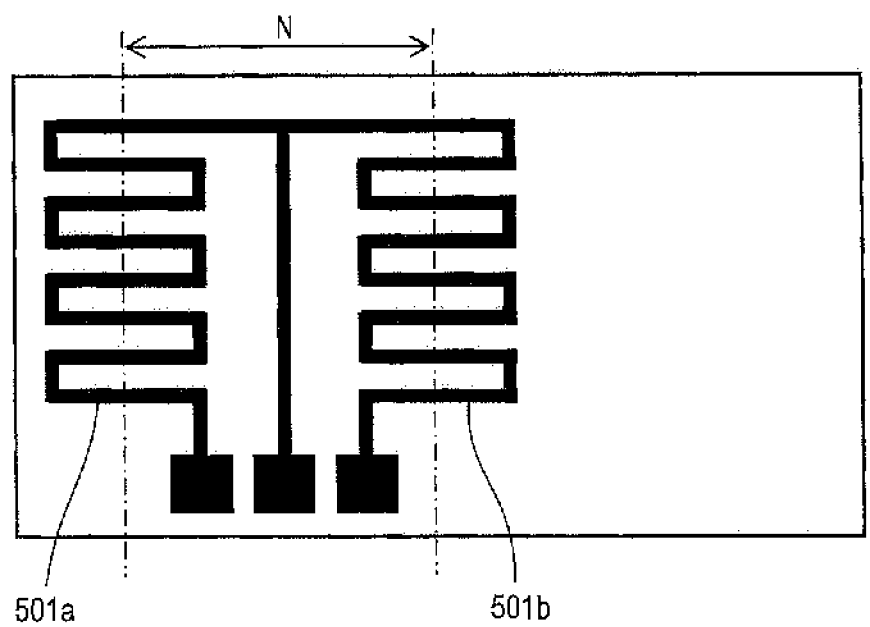

FIG. 18 is a side view showing locations of a substrate 1, a magnet 4, and a flux guide 5 of the magnetic position detection apparatus 80 according to the fifth embodiment of the invention by way of example.

As are shown in FIG. 17 and FIG. 18, the flux guide 5 is of a shape having first and second protrusions 5a and 5b as the flux guide 5 in the third embodiment above and additionally having a portion recessed in a concave shape to be spaced apart from the substrate 1, that is, a dent 5C in the vicinity of a center between the first and second protrusions 5a and 5b. When viewed along a magnetization direction of the magnet 4, the flux guide 5 is of a shape and at a location such that apart of the dent 5C overlaps the second and third magneto-electric converting elements 2b and 2c and a part of the rest of the flux guide 5 except for the dent 5C overlaps the first and fourth magneto-electric converting elements 2a and 2d.

When the magnetic position detection apparatus 80 is present solely and not opposed to the magnetic mobile object 100, the dent 5C of the flux guide 5 of the fifth embodiment that is spaced apart from the substrate 1 in the vicinity of the center between the first and second protrusions 5a and 5b is provided so as not to interfere with formation of a satisfactory magnetic field distribution of a square shape in a component in the substrate 1 of a magnetic field to be applied to the magneto-electric converting element 2 as in the third embodiment above. In addition, the respective magneto-electric converting elements 2 are disposed at positions at which each comes closer to the magnetic mobile object 100 when opposed to a tooth portion 101 of the magnetic mobile object 100 and therefore in a state where each undergoes a large variance of a magnetic field. At the same time, the dent 5C exerts an advantage of applying, to the second and third magneto-electric converting elements 2b and 2c, a magnetic field (however, a component in the substrate 1) larger than the one to be applied to the first and fourth magneto-electric converting elements 2a and 2d. In brief, the fifth embodiment is an example of the most effective configuration to achieve the object of the application. It is configured in such a manner that a differential output of the bridge circuit 20 is stabilized satisfactorily to have high robustness against a manufacturing variance when the magnetic position detection apparatus 80 is present solely and that a differential output of the bridge circuit 20 at a sufficiently wide amplitude can be obtained when opposed to the magnetic mobile object 100.

Sixth Embodiment

A magnetic position detection apparatus 80 according to a sixth embodiment of the invention uses a GMR element as a magneto-electric converting element. The GMR element is a device sensitive to a field in a substrate and has a markedly larger magneto-resistance effect than an MR element. Accordingly, the GMR element enables a magnetic position detection apparatus at a high S-to-N ratio and is therefore suitably used.

Hereinafter, respective components will be described.
Magneto-Electric Converting Element As has been described, the magneto-electric converting element 2 is an element whose electric resistance value varies with a magnetic field to be applied thereto and includes magneto-resistance elements, such as an MR (Magneto-Resistance) element, a GMR (Giant Magneto-Resistance) element, a TMR (Tunnel Magneto-Resistance) element, and a semiconductor device, such as a hall element. It should be noted, however, that the magneto-electric converting element 2 of interest in the application means a device sensitive to a field in a substrate having sensitivity to a magnetic field in the direction on the surface of the substrate 1 where the element is formed on.
Substrate The substrate 1 can be made of any material suitable to form the magneto-electric converting element 2 and an Si substrate provided with various inter-layer dielectric films and the like are used. Either a so-called hybrid configuration in which the bridge circuit 20 is formed on the substrate 1 and the detection circuit 30 is formed on another separate substrate 3 or a so-called monolithic configuration in which both the bridge circuit 20 and the detection circuit 30 are provided on the substrate 1 can be adopted. In the case of the monolithic configuration, the substrate 1 can be any substrate capable of forming an IC. Besides a normally used Si substrate, a GaAs substrate and an SiC substrate having high heat resistance are also available.

Magnet

The magnet 4 can be of any type (material) and shape (size) as long as it has a capability of applying an optimal magnetic field to the magneto-electric element 2. Any of types including a bond magnet, an iron-based magnet, a ferrite magnet, a rare-earth magnet, and an amorphous magnet is available. Also, the magnet 4 can be of any shape. The reason why the magnet 4 is of substantially a square pyramidal shape in the respective embodiments above is because a shape having a surface is handled more readily when the position of the magnet 4 is determined or the magnetization direction is determined.

Flux Guide

The flux guide 5 can be of any type (material) as long as it has a capability of applying an optimal magnetic field to the magneto-electric converting element 2. Any of soft magnetic materials having high saturation magnetic permeability, such as Fe, Co, and Ni and alloy thereof, is available and, among others, an Fe-based material is suitable.

Various modifications and alterations of this invention will be apparent to those skilled in the art without departing from the scope and spirit of this invention, and it should be understood that this is not limited to the illustrative embodiments set forth herein.

What is claimed is:

1. A magnetic position detection apparatus, comprising:
a substrate;
a magnet that applies a magnetic field in a z-direction perpendicularly to the substrate;
a bridge circuit comprising at least first and second magneto-electric converting elements provided on the substrate, each of which having an electric resistance value that varies with a variance of a magnetic field in association with a movement of a magnetic mobile object; and
a detection circuit that detects the movement of the magnetic mobile object according to an output of the bridge circuit,
wherein:
the detection circuit detects the movement of the magnetic mobile object on the basis of a voltage at a connection node of the first and second magneto-electric converting elements;
a surface of the substrate is substantially perpendicular to a magnetization direction of the magnet;
the second magneto-electric converting element is, when viewed along the magnetization direction of the magnet, disposed: (a) on a first straight line passing through a center point of a magnetic pole of the magnet and a rotation axis of the magnetic mobile object, the first straight line being parallel to the substrate; or (b) disposed in a vicinity of the first straight line;
the magnetic field applied by the magnet on the magneto-electric converting elements is not uniform at each of the magneto-electric converting elements; and
the first magneto-electric converting element is disposed in such a manner that, in the absence of the magnetic mobile object, an electric resistance value of the first magneto-electric converting element is substantially equal to an electric resistance value of the second magneto-electric converting element when the magnetic field applied by the magnet is not uniform at each of the magneto-electric converting elements,
wherein the magnetic anisotropic axis of both the first magneto-electric converting element and the second magneto-electric converting element are aligned along a same isomagnetic line passing through the first magneto-electric converting element and the second magneto-electric converting element in the absence of the magnetic mobile object.

2. The magnetic position detection apparatus according to claim 1, further comprising:
a flux guide made of a magnetic material and provided between the first and second magneto-electric converting elements and the magnet,
wherein:
the flux guide is of a plate-like shape having a surface perpendicular to the magnetization direction of the magnet;
the flux guide is, when viewed along the magnetization direction of the magnet, of a symmetrical shape with respect to the first straight line;
the flux guide is of a shape and at a location such that a part of a plate surface thereof overlaps the first and second magneto-electric converting elements; and
a center point of the flux guide is disposed closer to the magnetic mobile object than the center point of the magnetic pole of the magnet.

3. The magnetic position detection apparatus according to claim 2, wherein:
the flux guide is of a plate-like shape having a surface perpendicular to the magnetization direction of the magnet and provided with first and second protrusions protruding in a direction coming closer to a virtual plane, which is the surface of the substrate extended virtually, with a spacing in a direction perpendicular to the first straight line; and
the first magneto-electric converting element is disposed on a side of one of the protrusions with respect to the second magneto-electric converting element.

4. The magnetic position detection apparatus according to claim 2, wherein:
the flux guide is of a plate-like shape having a surface perpendicular to the magnetization direction of the magnet and provided with first and second protrusions protruding in a direction coming closer to a virtual plane, which is the surface of the substrate extended virtually, with a spacing in a direction perpendicular to the first straight line and a dent recessed concavely so as to be spaced apart from the substrate in a vicinity of a center between the first and second protrusions;
the second magneto-electric converting element is, when viewed along the magnetization direction of the magnet, disposed in such a manner that a part thereof overlaps the dent; and
the first magneto-electric converting element is disposed in such a manner that a part thereof overlaps a rest of the flux guide except for the dent.

5. The magnetic position detection apparatus according to claim 1, wherein:
the bridge circuit further includes third and fourth magneto-electric converting elements provided on the substrate, each of which has an electric resistance value that varies with the variance of the magnetic field in association with the movement of the magnetic mobile object;
the detection circuit detects the movement of the magnetic mobile object on the basis of a voltage difference between the voltage at the connection node of the first and second magneto-electric converting elements and a voltage at a connection node of the third and fourth magneto-electric converting elements;

the third magneto-electric converting element is, when viewed along the magnetization direction of the magnet, disposed: (a) on the first straight line, or (b) in the vicinity of the first straight line thereof; and the third and fourth magneto-electric converting elements are disposed in such a manner that, when not opposed to the magnetic mobile object, a z-direction component of the magnetic field applied by the magnet on the third and fourth magneto-electric converting elements is substantially the same as a z-direction component of the magnetic field applied by the magnet to the first and second magneto-electric converting elements.

6. The magnetic position detection apparatus according to claim 5, further comprising:

a flux guide made of a magnetic material and provided between the first through fourth magneto-electric converting elements and the magnet, wherein:

the flux guide is of a plate-like shape having a surface perpendicular to the magnetization direction of the magnet;

the flux guide is, when viewed along the magnetization direction of the of the magnet, of a symmetrical shape with respect to the first straight line;

the flux guide is of a shape and at a location such that a part of a plate surface thereof overlaps the first and second magneto-electric converting elements; and a center point of the flux guide is disposed closer to the magnetic mobile object than the center point of the magnetic pole of the magnet.

7. The magnetic position detection apparatus according to claim 6, wherein:

the flux guide is of a plate-like shape having a surface perpendicular to the magnetization direction of the magnet and provided with first and second protrusions protruding in a direction to come closer to a virtual plane, which is the surface of the substrate extended virtually, with a spacing in a direction perpendicular to the first straight line; and the first and fourth magneto-electric converting elements are disposed closer to the protrusions than the second and third magneto-electric converting elements, respectively.

8. The magnetic position detection apparatus according to claim 6, wherein:

the flux guide is of a plate-like shape having a surface perpendicular to the magnetization direction of the magnet and provided with first and second protrusions protruding in a direction coming closer to a virtual plane, which is the surface of the substrate extended virtually, with a spacing in a direction perpendicular to the first straight line and a dent recessed concavely so as to be spaced apart from the substrate in a vicinity of a center between the first and second protrusions;

the second and third magneto-electric converting elements are, when viewed along the magnetization direction of the magnet, disposed in such a manner that a part thereof overlaps the dent; and the first and second magneto-electric converting elements are disposed in such a manner that a part thereof overlaps a rest of the flux guide except for the dent.

9. The magnetic position detection apparatus according to claim 1, wherein:

the magneto-electric converting elements are giant magneto-resistance elements.

10. The magnetic position detection apparatus according to claim 1, wherein:

the magneto-electric converting elements are disposed in such a manner that, when opposed to a slot portion of the magnetic mobile object provided with a tooth portion and the slot portion along a periphery thereof, the electric resistance values of all the magneto-electric converting elements are substantially equal to each other when the magnetic field applied to the magneto-electric converting elements is substantially equal to the magnetic field applied by the magnet.

11. A magnetic position detection apparatus, comprising:

a substrate;

a magnet having a magnetization in a z-direction perpendicular to a surface of the substrate;

a bridge circuit comprising a first magneto-electric converting element (MECE), a second MECE, a third MECE, and a fourth MECE disposed on the surface, each of which has an electric resistance value that varies with a variance of a magnetic field in association with a movement of a magnetic mobile object;

a detection circuit configured to detect the movement of the magnetic mobile object according to an output of the bridge circuit;

wherein:

the magnetic field applied by the magnet on the magneto-electric converting elements is not uniform at each of the magneto-electric converting elements;

the first, second, third and fourth MECEs are disposed on the surface such that, in the absence of the magnetic mobile object, the resistances of each of the MECEs are substantially equal to each other when the magnetic field applied by the magnet is not uniform at each of the magneto-electric converting elements, wherein the magnetic anisotropic axis of each of the first, second, third and fourth MECEs are aligned along a same isomagnetic line passing through each of the first, second, third and fourth MECEs in the absence of the magnetic mobile object.

12. The apparatus of claim 11, wherein:

the first, second, third and fourth MECEs have substantially the same shape;

the first, second, third and fourth MECEs are disposed on the surface such that, in the absence of the magnetic mobile object, the distribution of the z-component of the magnetic field on each of the MECEs is substantially identical with each other.

13. The apparatus of claim 12, wherein:

the first and fourth MECEs are disposed at an angle with respect to the second and the third MECEs.

14. The apparatus of claim 13, wherein:

each of the MECEs comprises a wiring pattern comprising a plurality of wires substantially parallel with each other and connected in series to each other;

the wiring patterns of the MECEs are substantially identical with each other;

corresponding wires of each of the MECEs follow a same isomagnetic line; and the isomagnetic line is substantially a curved line.

15. The apparatus of claim 13, wherein:

the second and the third MECEs are disposed on a central-line parallel with the surface and perpendicular to a movement direction of the magnetic mobile object, and the central-line passes through a center point of a pole-surface of the magnet;

the second and the third MECEs are intertwined with each other; and the first and the fourth MECEs are disposed off the central line.

16. The apparatus of claim 13, wherein the bridge comprises:
a first node connecting the first and third MECEs;
a second node connecting the first and second MECEs;
a third node connecting the second and third MECEs;
a fourth node connecting the third and fourth MECEs; and
wherein the output comprises a voltage at the second node and a voltage at the fourth node.

17. The apparatus of claim 12, wherein:
the first, second, third and fourth MECEs are parallel with each other;
the second and the third MECEs are disposed on a central-line parallel with the surface and perpendicular to a movement direction of the magnetic mobile object, the central-line passing through a center point of a pole-surface of the magnet;
the second and the third MECEs are intertwined with each other; and
the first and the fourth MECEs are disposed off the central line.

18. The apparatus of claim 12, wherein:
the first, second, third and fourth MECEs are parallel with each other;
each of the MECEs comprises a wiring pattern comprising a plurality of wires substantially parallel with each other and connected in series to each other;
the wiring patterns of the MECEs are substantially identical with each other;
corresponding wires of each of the MECEs follow a same isomagnetic line; and
the isomagnetic line is substantially a straight line.

19. The apparatus of claim 17, wherein the bridge comprises:
a first node connecting the first and third MECEs;
a second node connecting the first and second MECEs;
a third node connecting the second and third MECEs;
a fourth node connecting the third and fourth MECEs; and
wherein the output comprises a voltage at the second node and a voltage at the fourth node.

20. A magnetic position detection apparatus, comprising:
a substrate;
a magnet having a magnetization in a z-direction perpendicular to a surface of the substrate;
a bridge circuit comprising at least a first MECE and a second MECE disposed on the surface, each of which has an electric resistance value that varies with a variance of the magnetic field in association with a movement of a magnetic mobile object; and
a detection circuit configured to detect the movement of the magnetic mobile object according to an output of the bridge circuit, the output comprising a voltage at a connection node of the first and second MECEs;
wherein:
the first MECE is disposed on a central-line parallel with the surface and passing through the rotation axis of the magnetic mobile object and through a center point of a pole-surface of the magnet;
the second MECE is disposed off the central-line and is spaced apart from the first MECE;
the magnetic field applied by the magnet on the magneto-electric converting elements is not uniform at each of the magneto-electric converting elements; and
the first MECE and the second MECE are disposed on the surface such that, in the absence of the magnetic mobile object, the resistances of the first MECE and the second MECE are substantially equal to each other when the magnetic field applied by the magnet is not uniform at each of the magneto-electric converting elements,
wherein the magnetic anisotropic axis of the first MECE and the second MECE are aligned along a same isomagnetic line passing through the first MECE and the second MECE in the absence of the magnetic mobile object.

21. The apparatus of claim 20, wherein:
the first MECE and the second MECE have substantially the same shape; and
the first MECE and the second MECE are disposed on the surface such that, in the absence of the magnetic mobile object, the distribution of the z-component of the magnetic field on the first MECE is substantially identical with the distribution of the z-component of the magnetic field on the second MECE.

22. The apparatus of claim 20, wherein:
each of the MECEs comprises a wiring pattern comprising a plurality of wires substantially parallel with each other and connected in series to each other;
the wiring patterns of the MECEs are substantially identical with each other; and
corresponding wires of each of the MECEs follow a same isomagnetic line.

23. The apparatus of claim 22, wherein the isomagnetic line is substantially a straight line.

* * * * *